J. H. JACOBS.
PRECISION BALANCE.
APPLICATION FILED JULY 2, 1917.

1,281,968.

Patented Oct. 15, 1918.
2 SHEETS—SHEET 1.

Inventor
Joseph H. Jacobs.

By
Attorney

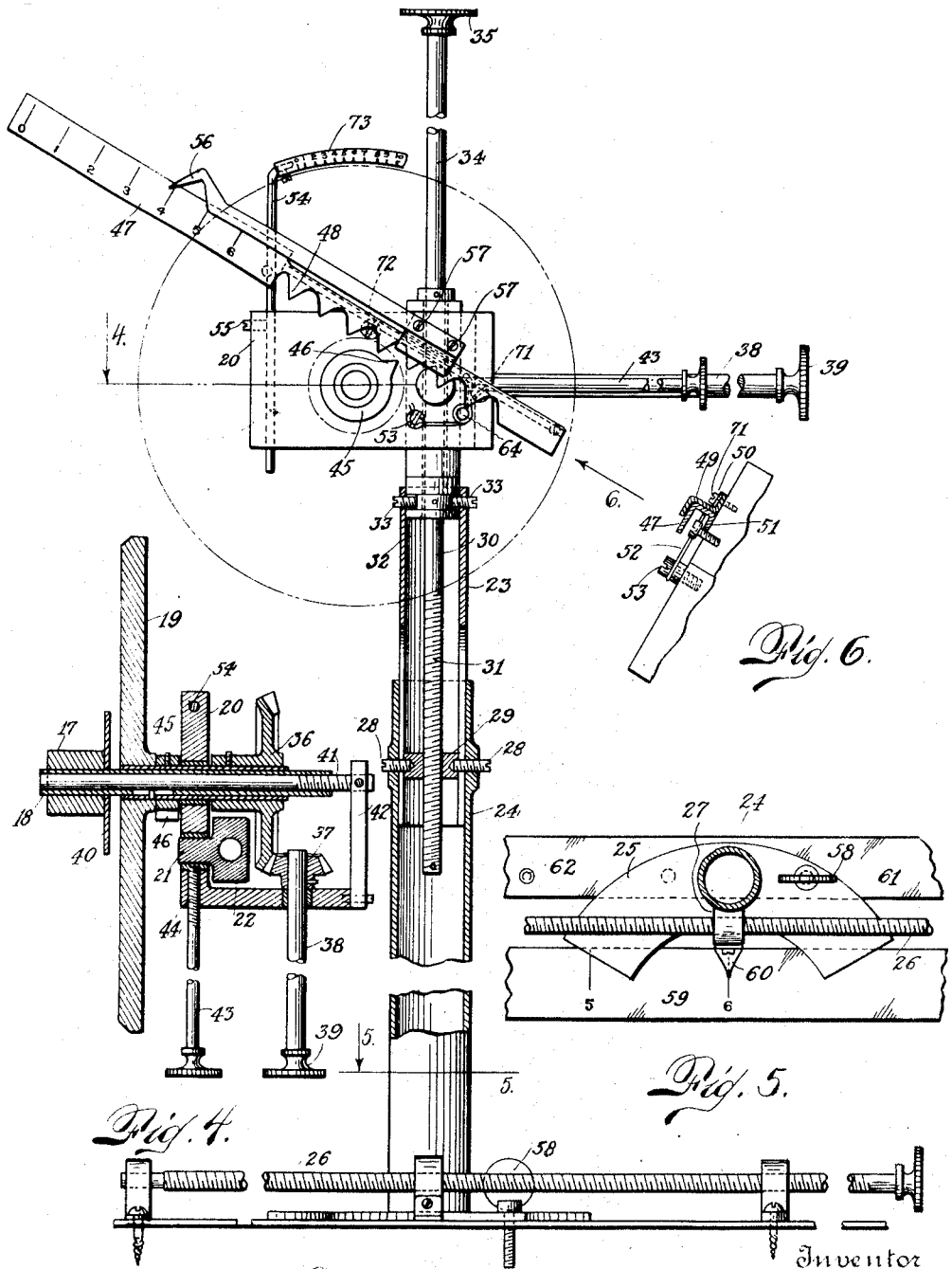

UNITED STATES PATENT OFFICE.

JOSEPH H. JACOBS, OF DENVER, COLORADO.

PRECISION-BALANCE.

1,281,968.   Specification of Letters Patent.   Patented Oct. 15, 1918.

Application filed July 2, 1917. Serial No. 178,105.

*To all whom it may concern:*

Be it known that I, JOSEPH H. JACOBS, a citizen of the United States, residing at the city and county of Denver and State of Colorado, have invented certain new and useful Improvements in Precision-Balances; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in precision balances, or those of the class in which accurate weighing is required, as in assay and other similar work. My improvements are employed in this connection with the type of machines in which a chain is used, one extremity of which is connected with the beam while the other extremity is connected with an adjustable element, whereby more or less of the length of the chain may be transferred to or removed from its influence on the beam where particularly accurate work or fine divisions of a unit are required, the adjustable device being graduated and arranged to coöperate with a vernier, as is generally the case where great precision is required.

Having briefly outlined the invention, as well as the function it is intended to subserve I will proceed to describe the same in detail, reference being made to the accompanying drawing in which is illustrated an embodiment thereof. In this drawing:

Fig. 3 is a view of the mechanism shown partly in section and on a larger scale.

Fig. 4 is a section taken on the line 4—4 Fig. 3 looking downwardly.

Fig. 5 is a fragmentary, sectional view similar to the right hand portion of Fig. 2 shown on a larger scale.

Fig. 6 is an end view of a portion of the device looking in the direction of arrow 6, Fig. 3.

The same reference characters indicate the same parts in all the views.

Figure 1:
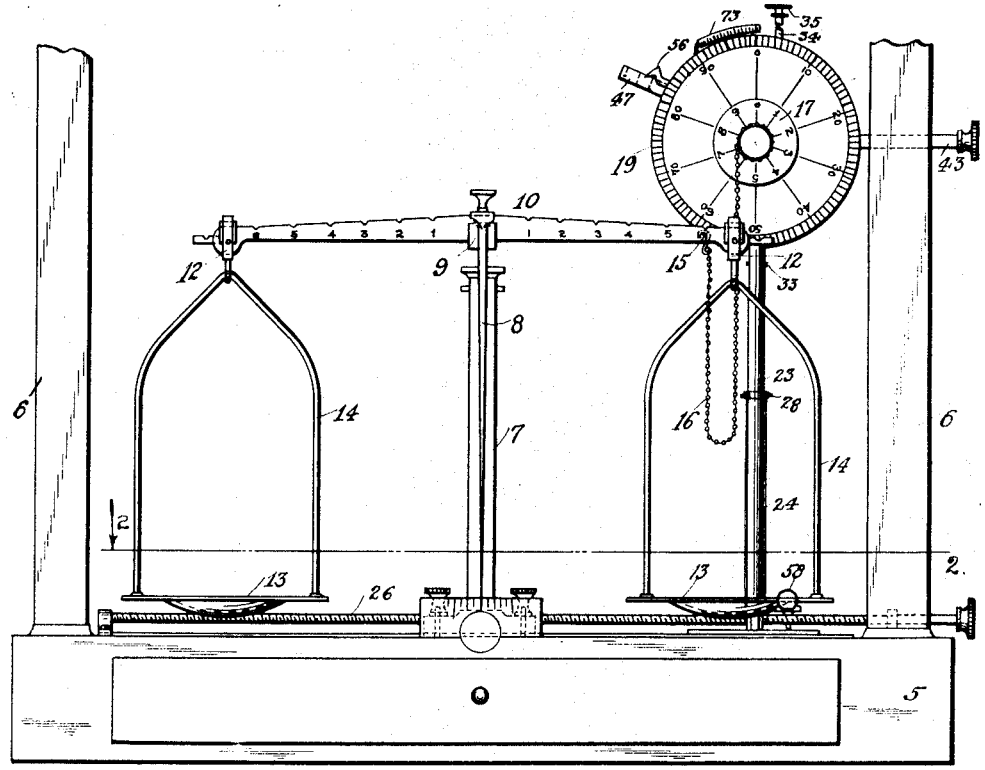
Figure 1 is a front elevation of a balance equipped with my improvement.
Figure 2:
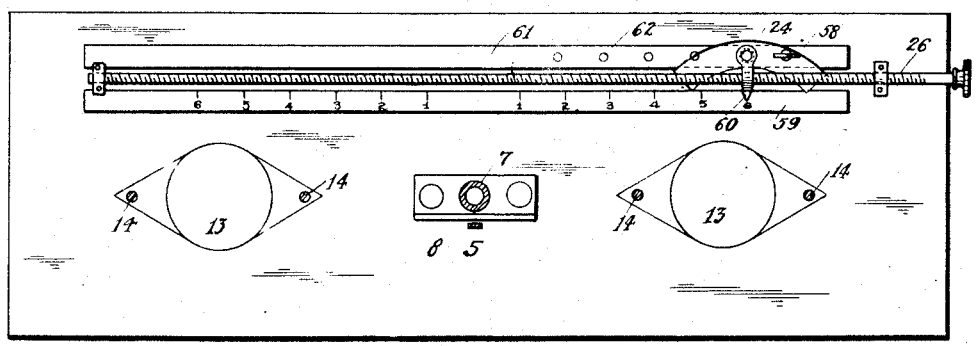
Fig. 2 is a top plan view of the base of the structure illustrating one of the adjustable features. This may be considered a section taken on the line 2—2 Fig. 1.

Let the numeral 5 designate a suitable base and 6 upright frame posts, which in the completed structure will form supports for glass plates which should be used to inclose the mechanism in order to protect the same from dust and other foreign particles of matter which otherwise would interfere with accurate work. Mounted upon the base 5 is a hollow central post 7, through which passes a vertically, adjustable stem 8, to the top of which is secured a knife-blade bearing 9 for the beam 10; these features being of ordinary construction. To the opposite extremities of the beam 10 are connected by means of knife-blade bearings 12, the usual pans 13, to the opposite ends of which are secured the depending wires 14, which are hung at the lower extremities of the knife-blade bearings 12 when the construction is in use. To a pin 15, near one extremity of the beam 10, is connected one end of a weighing chain 16, the opposite end of the chain being connected with an adjustable drum 17 mounted on one end of a hollow spindle 18 upon which is also mounted a graduated dial 19, the said spindle being journaled in a frame 20 which is mounted to rock on a wrist-pin 21 extending laterally from the upper flattened extremity 22 of a tube 23 which telescopes in a tubular post 24 which is secured at its lower extremity to a segmental plate 25 mounted on the base 5 of the instrument and is adjustable thereon by means of a screw 26 which is journaled in the frame of the structure and engages a nut 27 connected with the post 24 in such a manner as to adjust the post longitudinally of the base as may be required and as hereinafter more fully explained.

A nut 29 is held in place within the tubular post by screws 28 whose inner extremities engage recesses in the said nut. To the upper extremity of the tube 23 is secured in any suitable manner the flattened part 22 carrying the wrist pin 21, as heretofore explained. A vertically disposed stem 30, having a lower threaded portion 31, is threaded into the nut 29, the said stem 30 having a cylindrical part 32 journaled in the upper extremity of the tube 23 and connected therewith by screws 33 which are threaded into the tube and engage a circumferential groove formed in the part 32. The stem 30 passes vertically through the part 22 which is perforated for the purpose, and turns freely therein, its upper portion 34 extending above the casing of the structure and having a milled-head 35 to facilitate adjustment. Hence, as the stem 30 is rotated, it will move vertically either upwardly or downwardly depending upon the direction of its rotation by virtue of the fact that its lower threaded portion 31 engages the nut 29, and as this stem moves vertically it will carry the tube 23 with it and consequently the frame member 20, by virtue of the construction heretofore explained. Secured to the spindle 18 is a bevel gear 36 which meshes with a pinion 37 fast on a horizontally disposed spindle 38 whose outer extremity 39 protrudes beyond the casing and is, therefore, exposed for purposes of adjustment. Hence, as the spindle 38 is rotated, the spindle 18 will also be actuated, whereby the dial 19 together with the drum 17 will be actuated, whereby the weighing chain 16 will be adjusted, its vertical run being either raised or lowered according as the chain is wound upon or unwound from the drum 17. This drum 17 is frictionally adjustable on the spindle 18 and it carries a circular, graduated flange 40 which is provided with numerals or other indicia, so that it may be properly adjusted to correspond with the numbered graduations of the dial 19. It should be explained that a number of drums 17 should accompany each instrument, these drums being removable and replaceable so that drums of various sizes may be employed according as it is necessary to wind or unwind the weighing chain with greater or less rapidity during the adjustment of the spindle 18. Both the drum 17 and the dial 19 are frictionally adjustable on the spindle, but rotate with the latter during the adjustment of the weighing chain through the medium of the spindle 38 and the gears 36 and 37, as heretofore explained. In adjusting the weighing chain it is important that the two parallel runs, respectively depending from the end of the beam and the drum 17, should be uniformly spaced at all times. Hence, in order to compensate for the movement of the run connected with the drum, as its convolutions are wound thereon or unwound therefrom, the inner extremity of the hollow spindle 18 is threaded to engage a stationary threaded stud 41 which is connected with the frame member 20 by means of an arm 42. Hence, as the spindle is threaded and the chain wound upon or unwound from the drum, the longitudinal travel of the spindle in the proper direction, through the medium of the screw stud will exactly compensate for the variation in lateral travel of the vertical run of the weighing chain connected with the drum, due to the winding or unwinding of the chain. In this way, the two vertical runs of the chain are maintained, uniformly spaced as required for proper weighing conditions.

During the vertical adjustment of the frame 20 and the mechanism mounted thereon, it would be necessary for the glass or other casing of the instrument to be slotted to make room for the operating spindle 38, unless some provision were otherwise made. The rocking movement of the frame 20 on the wrist-pin 21 will compensate for a slot in the casing within reasonable limits, or within the limits required by such vertical adjustment. When the vertical adjustment of the frame is completed, a set-screw 43, which is threaded into the frame as shown at 44, is tightened on the wrist-pin 21, the stem of the screw passing through an opening in the glass case and having a milled head exposed for purposes of adjustment. It will be understood that the openings for the screw stem 43 and the spindle 38 must be so constructed as to permit the tilting of these members to the inclined positions made necessary by the adjustment of the frame. This vertical adjustment of the frame together with the parts mounted thereon, on the hollow post 24, permits the varying of the relative length of the two vertical runs of the weighing chain without rotating the dial 19 and its connections.

Every time the dial 19 is given a complete rotation through the medium of the gears 36 and 37, a collar 45 fast on the spindle 18 and carrying a tooth 46, will act upon a straight, graduated member 47 to advance the same one space, the latter being properly graduated for the purpose. The tooth 46 of the collar 45 acts upon companion teeth 48 of the member 47, the teeth 48 being properly spaced for the purpose. The member 47, as illustrated in the drawing, occupies an inclined position and is slidably mounted on the frame though the medium of a guide 49 which is secured to the frame, as shown at 50, and two screws 71 and 72 whose heads, in conjunction with the frame parts in which the screws are inserted, form a groove for the inner flange 51 of the member 47, the guide 49 engaging the outer flange of the said member, the latter being approximately U-shaped in cross section where it is connected with the frame, the U-shaped or trough-shaped part being of sufficient length for purposes of adjustment. The member 47 is held under tension by means of a wire spring 52 which is secured to the frame, as shown at 53, at one extremity after which it is wound around a stud 64, being finally carried upwardly into engagement with the trough-shaped part of the member 47.

A vernier 73 is secured to the upper extremity of a rod 54, the latter being vertically adjustable in the frame 20 by means of a set-screw 55. This vernier is employed in conjunction with the graduated dial 19 for accurate determination of weighing results and coöperates with the graduated portion of the dial in the well-known manner. A suitable pointer 56 is secured to the frame 20, as shown at 57, and coöperates with the graduations on the member 47. The adjustment of the hollow post 24 upon the base 5 of the instrument is effected by turning the screw 26 in the nut 27, after a fastening screw 58, which connects the segmental plate with the base has been removed. The base is provided with a graduated plate 59 which coöperates with a pointer 60, and also with a plate 61, which is provided with threaded perforations 62 which are engaged by the fastening screw 58 after the post has been properly adjusted on the base in order to maintain the two vertical runs of the weighing chain in the properly and uniformly spaced relation. This adjustment is important, when the position of the extremity of the chain which is connected with the beam 10 is changed, as when this extremity of the chain is connected with a rider which is adjustable on the beam.

From the foregoing description the use and operation of my improvement will be readily understood. Assuming that the parts are constructed and assembled as illustrated in the drawing, the adjustment of the weighing chain is effected by turning the spindle 38, whereby the spindle 18 carrying the dial 19 is rotatably actuated, or by vertically adjusting the frame work 20 and its connections through the medium of the screw stem 23, as heretofore explained.

Having thus described my invention, what I claim is:

1. A precision balance equipped with a beam, a weighing chain arranged to have one end connected with the beam, and rotatable indicating means with which the other end is connected, said means including a spindle carrying a plurality of relatively movable, graduated, indicating members coöperating with each other to give the readings.

2. A precision balance equipped with a beam, a weighing chain, one end of which is connected with the beam, and rotatable indicating means with which the other end is connected, said means including a spindle carrying a plurality of relatively movable coöperating indicating members, one of said members being frictionally adjustable on the spindle relatively to another and also arranged to rotate with the spindle.

3. A balance having a beam, a weighing chain, one end of which is connected with the beam, and rotatable indicating means with which the other end is connected, said means including a spindle carrying a plurality of relatively movable coöperating graduated indicating members, one of said members being frictionally adjustable on the spindle relatively to another and also arranged to rotate with the spindle, and a vernier coöperating with one of said members.

4. A balance equipped with a beam, a weighing chain, having one end connected with the beam, and rotatable indicating means with which the other end is connected, said means including a spindle carrying a graduated member, and means for vertically adjusting the spindle and its connections.

5. A balance of the class described including a beam, a chain having one extremity connected with the beam, a post, a frame tiltably mounted on the upper extremity of the post, a spindle journaled in said frame, and an operative connection between the other end of the weighing chain and the spindle.

6. A precision balance including a beam, a chain having one extremity connected with the beam, a post composed of two telescoping members, means for adjusting the upper member vertically, a frame mounted on the upper extremity of the upper member, a spindle journaled in said frame, and an operative connection between the other end of the weighing chain and the spindle.

7. A balance of the class described including a beam, a chain having one extremity connected with the beam, a post composed of two telescoping members, a frame mounted on the upper extremity of the post, a spindle journaled in said frame, means for adjusting the upper member of the post vertically, said means comprising a screw stem journaled in the upper member and threaded in a nut with which the lower stationary member is equipped.

8. A precision balance including a beam, a chain having one extremity connected with the beam, a post, a frame mounted on the upper extremity of the post, a spindle journaled in said frame, a graduated disk mounted on the spindle, an indicating device slidably mounted on the frame, and an operative connection between said indicating device and the spindle, to move said indicating device one space for each rotation of the spindle.

9. A precision balance including a beam, a chain having one extremity connected with the beam, a post, a frame mounted on the upper extremity of the post, a spindle journaled in said frame, the other extremity of the chain being connected with the spindle, and means for adjusting the post bodily to maintain the parallel runs of the chain uniformly spaced, as the position of the chain extremity connected with the beam is varied.

10. A precision balance including a beam, a chain having one extremity connected with the beam, a post, a frame tiltably mounted on the upper extremity of the post, a spindle journaled in said frame, the other extremity of the weighing chain being connected with the spindle, a second spindle, an operative connection between the first named spindle and the second spindle, whereby as the latter is rotated the first named spindle is actuated, a set screw for locking the frame in place on the post, a casing for the mechanism, said casing being provided with openings to allow the second spindle and the set screw to protrude, said openings being of such character as to permit vertical adjustment of the frame on the post, and means for obtaining such adjustment substantially as described.

11. A precision balance comprising a beam, a base, a post slidably mounted on the base and equipped with a nut, a screw journaled on the base and engaging said nut, a frame mounted on the upper extremity of the post, a spindle journaled in said frame, a weighing chain having one extremity connected in operative relation with the spindle, while the other extremity is connected with the beam.

12. A precision balance including a beam, a post, a frame mounted on the upper extremity of the post, a spindle journaled in said frame, a weighing chain having its extremities respectively connected with the beam of the balance and with the said spindle, a graduated indicating member having a toothed portion, a collar mounted on the spindle and having a coöperating tooth adapted to engage a tooth of the indicating member and move the latter one space for each rotation of the spindle, and tension means engaging the indicating member substantially as described.

13. A precision balance including a beam, a base, a post slidably mounted on the base and provided with a nut, a screw journaled on the base and threaded in the nut, the lower part of the post being provided with a pointer, a graduated plate secured to the base and coöperating with the said pointer, a frame mounted on the upper extremity of the post, a spindle journaled in said frame, a graduated dial mounted on the spindle, and a weighing chain having one extremity operatively connected with the spindle while the other extremity is connected with the beam.

In testimony whereof I affix my signature.

JOSEPH H. JACOBS.